United States Patent [19]

Schedwin

[11] Patent Number: 4,577,847

[45] Date of Patent: Mar. 25, 1986

[54] CLAMPING DEVICE

[76] Inventor: Sven-Erik Schedwin, Box 8280, Falun, Sweden

[21] Appl. No.: 599,183

[22] Filed: Apr. 11, 1984

[30] Foreign Application Priority Data

Apr. 12, 1983 [SE] Sweden .................. 8302028

[51] Int. Cl.⁴ .............................................. B23Q 3/02
[52] U.S. Cl. .................................................. 269/309
[58] Field of Search .......................... 269/81–85, 269/20, 91–94, 239, 309, 310; 254/18; 409/903; 198/345

[56] References Cited

U.S. PATENT DOCUMENTS

| 3,978,576 | 9/1976 | Mustoe | 254/18 |
| 4,275,983 | 6/1981 | Bergman | 269/20 |
| 4,496,139 | 1/1985 | Lenz | 269/82 |

FOREIGN PATENT DOCUMENTS

| 148319 | 5/1981 | Fed. Rep. of Germany | 269/309 |
| 1543119 | 3/1979 | United Kingdom | 254/18 |

639681 12/1978 U.S.S.R. .................. 269/310

*Primary Examiner*—Robert C. Watson
*Attorney, Agent, or Firm*—Witherspoon & Hargest

[57] ABSTRACT

The invention relates to a clamping device, especially for clamping work tables, fixtures etc. to a base such as the machine table in a machine tool, comprising a holding means (2) having an enlarged head (4) and clamping means (8) which in the clamping position engage the head (4) of the holding means (2) and a clamping mechanism (7) which in its normal condition acts with its full clamping force against the clamping means but which unloads the clamping means when a disengagement force is applied thereto. In accordance with the invention the clamping means consist of clamping hooks (7) which are pivotable between a clamping position, in which they engage the head (4) of the holding means (2), and a disengagement position, in which they completely disengage the head of the holding means, during simultaneous movement thereof in a direction opposite the clamping direction, and reverse.

6 Claims, 3 Drawing Figures

CLAMPING DEVICE

BACKGROUND OF THE INVENTION

1. Field of the Invention

This invention relates to a clamping device, especially, but not exclusively, for clamping work tables, fixtures or the like to a base in e.g. machine tools, comprising a holding means having an enlarged head, clamping means which in their clamping position engage the enlarged head of the holding means, and a clamping mechanism which in its normal condition applies its full clamping force to the clamping means, but which unloads the clamping means when an disengagment force is applied thereto. Moreover the invention relates to a method and an arrangement for combined cleaning and accuracy control by a clamping device of the kind indicated above.

2. Description of the Prior Art

All of the clamping devices presently available on the market suffer from at least some of the following disadvantages: The devices comprise a great number of parts having such exposed positions that they become sensitive to fouling and wear, in connection with machining by detachment of cuttings there is also a great danger that cuttings may assemble on the different parts and prevent a correct clamping; the devices require much space and this means that the work part (e.g. a fixture) that is to be clamped must be oversized in order to accomodate the clamping devices, and moreover it is difficult to install these clamping devices in e.g. an existing machine tool; they comprise at least some projecting part which makes it impossible to transport the work piece to be clamped on e.g. roll conveyors, without damaging said projecting part, the clamping devices are in themselves, i.e. irrespective of the modifications that must be carried out on the work part to be clamped or on the existing machine tool, very expensive to manufacture. Finally these known clamping devices often require the use of a separate hydraulic unit for applying the necessary clamping force.

An example of such a known clamping device is that commonly used for clamping pallets or fixtures by machining centres. This known device comprises a clamping plate intended to be inserted into a substantially T-shaped recess at the bottom of the pallet. The clamping plate is firmly connected to a cylinder housing in which a piston is provided which seals against the inner wall of the cylinder housing and which is stationary in relation to the machine table of the machining centre, but which is slidable in relation to the cylinder housing, whereby the cylinder housing and the clamping plate connected thereto are movable up and down in the clamping direction when pressurized fluid is introduced at the upper side and lower side respectively of the piston. When clamping a pallet the clamping plate engaging the T-shaped recess assists in bringing the pallet to a position engaging a number of stops provided on the machine table. This known device suffers from almost all of the above mentioned disadvantages. Thus the T-shaped recess in the pallet is extremely exposed to fouling and cuttings which are difficult to remove efficiently gather in this recess as well as on the clamping plate. It frequently happens that such accumulations of cuttings bring the machining centre to a standstill whereupon the pallet and the clamping device have to be manually cleaned from these cuttings.

Another known clamping device of the kind in question is almost impossible to install in existing machine tools due to its bulky configuration, and even if such an installation could be possible it would require a hydraulic unit provided in connection thereto since the clamping device demands relatively large amounts of hydraulic fluid for the maneuvering thereof. Finally this known clamping device requires that the pallet or fixture is provided with the above mentioned T-shaped groove at its bottom and as discussed above this means that the pallet becomes impossible to transport on e.g. a roll conveyor. This special design of the pallet brings about the disadvantage that this as well as the clamping device in itself becomes much more expensive.

However, through Swedish printed and published specification No. 7804353-6 there is previously known a clamping device of the kind mentioned initially, which eliminates one or some of the above discussed disadvantages. This last mentioned, known clamping device is however, designated for a very specific and narrowly delimited range of application since it is adapted for clamping a two-part tool in a press or injection machine or the like. More specifically this means that the clamping device consists of an upper and a lower clamping unit, i.e. one unit for the upper tool and one unit for the lower tool arranged at a distance from the upper tool. It is however possible to use these upper and lower clamping units one by one for other clamping purposes, but even in such a case these suffer from very serious shortcomings and limitations regarding the use thereof.

Thus, said lower clamping unit comprises a holding means consisting of two elongate guide bars, while the clamping means consists of a pin having a head and being connected to the clamping mechanism so that it, when it has been inserted sideways into the groove formed by the guide bars, engages the guide bars with its head when the clamping mechanism is maneuvred. Like the above described clamping device for pallets this lower clamping unit suffers from the disadvantage that the guide bars (which to a great extent correspond to the T-shaped groove in the pallet) render a transportation of the tool on a roll conveyor impossible. Dirt and cuttings may also very easily get stuck in the guide bars so that they prevent clamping. As mentioned above it is also very difficult to perform an effective cleaning of such an elongate guide groove. Moreover the complete clamping unit, in the clamping position also the guide bars, is provided in or below the machine table and this means that it would be very complicated and unacceptably expensive to modify an existing machine tool so that this clamping unit could be employed.

The upper clamping unit likewise comprises a holding means consisting of two elongate guide bars attached to the rear side of the tool and involving the above discussed disadvantages. However, in this case the clamping means consists of a pin having two opposite projections at its outer end. After the tool has been brought down against the work table, but prior to the application of the clamping force, the clamping means is rotated so that its projections engage the recess or groove of the guide bars, and this is a long known principle for the clamping of work pieces on a work table by means T-shaped grooves. The disadvantage of this solution is that very bulky operating devices are required for rotation the clamping means. Moreover the disclosed solution, where the clamping mechanism consists of a piston against which cup springs act, is most inappropriate in this case since the piston is rotated together with the clamping means and consequently is subject to a very hard wear of the surface facing the cup springs. Otherwise this upper clamping unit to an even greater extent suffers from the same disadvantages as the above described lower clamping unit.

SUMMARY OF THE INVENTION

The object of the present invention is to provide a clamping device of the kind indicated in the introduction, which as far as possible eliminates the above discussed shortcomings of previously known clamping devices, and which also makes it possible to perform a very efficient and precise clamping with high repetition accuracy. Another object of the invention is to provide a method and an arrangement for the combined efficient cleaning of the clamping device and efficient accuracy control of the clamping.

These objects are achieved by means of the characterizing features indicated in the enclosed patent claims.

BRIEF DESCRIPTION OF THE DRAWING

A preferable embodiment of the invention is described more closely below in connection with the enclosed drawings, in which.

DESCRIPTION OF THE PREFERRED EMBODIMENTS

Figure 1:
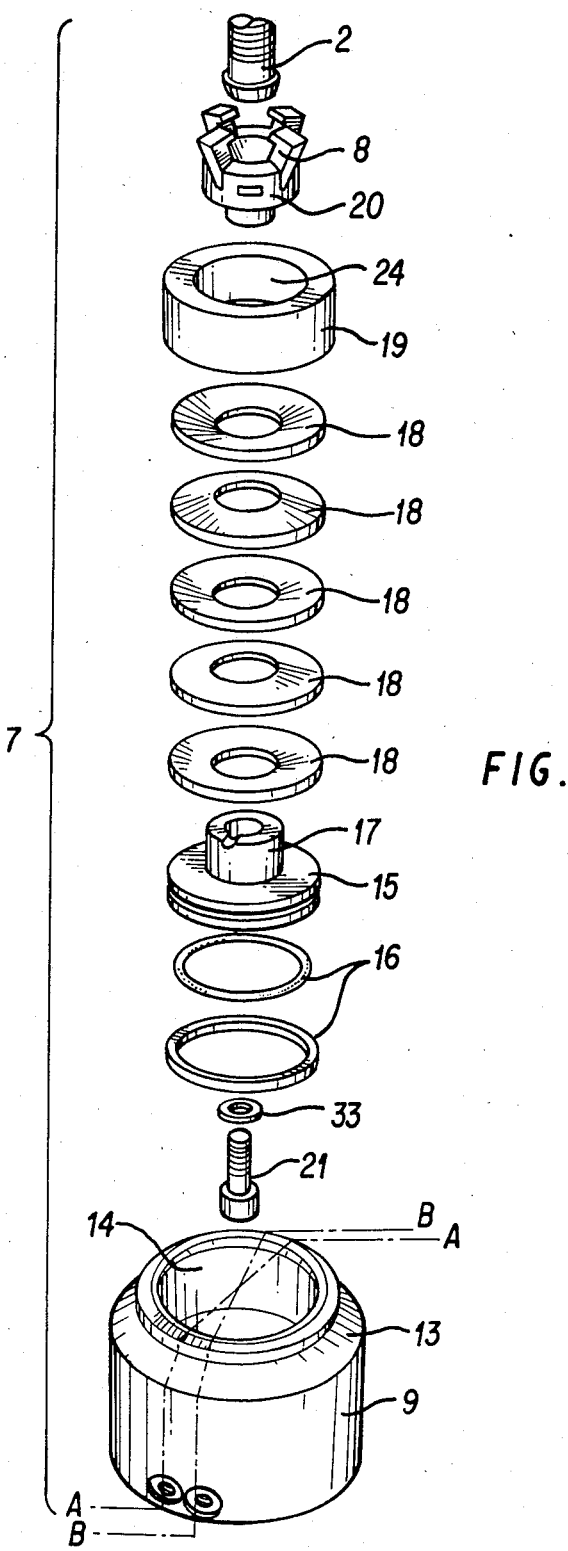
FIG. 1 is an exploded view of a preferable embodiment of the clamping device according to the invention.
Figure 2:
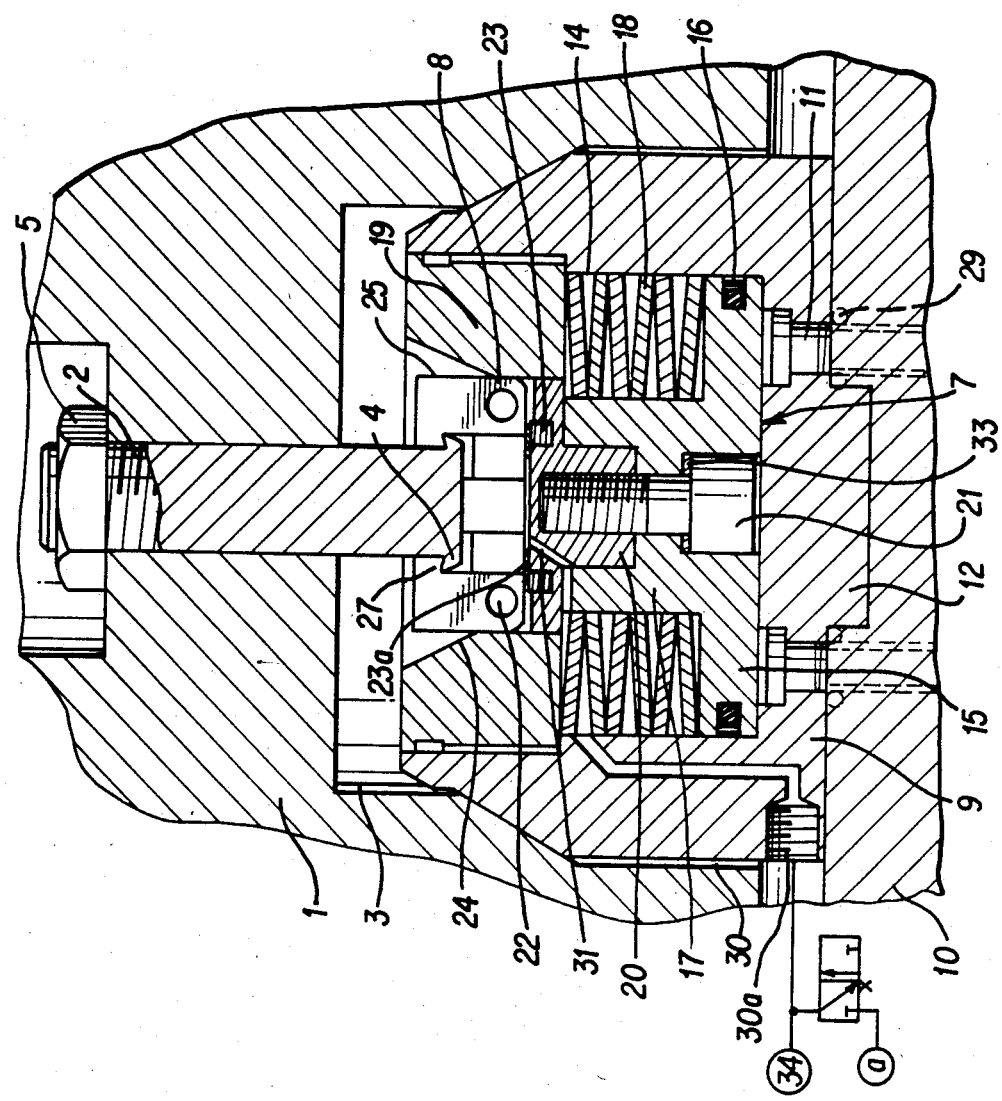
FIG. 2 is a section through the clamping device of FIG. 1 in the clamping position and taken along the line A—A in FIG. 1.
Figure 3:
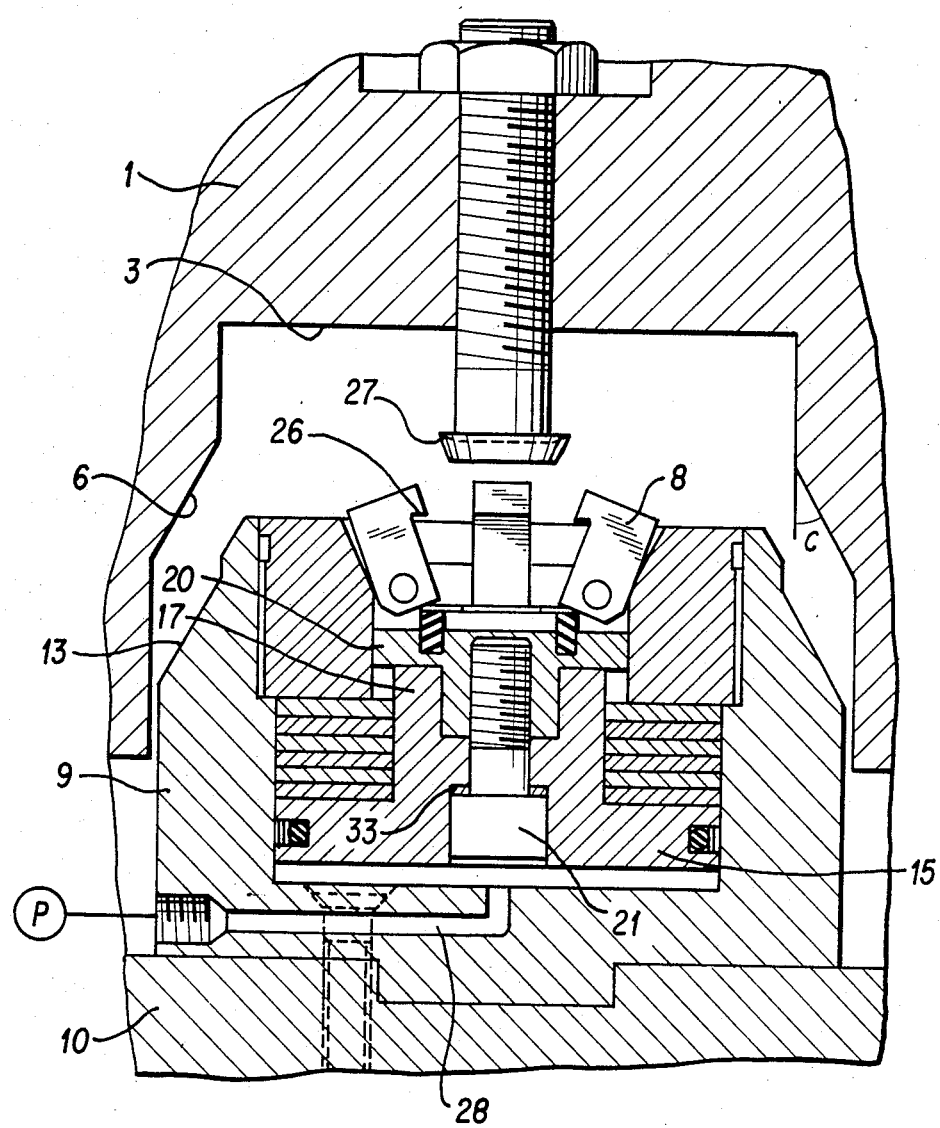
FIG. 3 is a section through the clamping device of FIG. 1 in the disengagement position and taken along the line B—B in FIG. 1.

The exemplifying embodiment of the invention illustrated and described herein is especially adapted for use in clamping a pallet, a cube or any other fixture in a machine tool where great accuracy is required and where the clamping must be performed with a very great repetition accuracy, i.e. where it must be possible to clamp the fixture over and over again in exactly the same position and with the same force. With specific reference to FIGS. 2 and 3 the clamping device basically consists of a holding means 2 secured in a recess 3 in the fixture 1 and shaped as a cylindrical pin having an enlarged head 4 at its end protruding into the recess 3. The holding means 2 is in its end facing the fixture provided with an external thread and is screwed into a hole in the fixture which is provided with a corresponding thread. Preferably the last mentioned end of the holding means 2 is accessible from the upper side of the fixture 1 and is provided with a socket for e.g. and Allen wrench. Hereby the holding means may easily be adjusted so that a firm locking or clamping may be achieved, and the holding means 2 is prefearbly fixed in the adjused position by means of a nut 5. The recess 3 in the fixture 1 is preferably circular in cross-section and in the illustrated embodiment it is provided with a tapered shoulder 6 for accurate guiding of the fixture down over the clamping device, and the importance of this guide shoulder 6 will be discussed more closely below.

The clamping device furthermore consists of the actual clamping mechanism 7 and the clamping means 8 connected thereto. The clamping means 8 are mounted in a housing 9 which in turn is screwed onto to the machine table 10 by means of a number of, preferably four, bolts 11. In order to prevent displacement of the housing 9 its bottom is provided with a preferably circular projection 12 which is fitted into a corresponding recess in the work table 10. The outer wall of the housing 9 has such a shape and size that it with a slight clearance may be inserted into the recess 3 of the fixture 1, and it is also provided with a tapered shoulder 13 corresponding to the tapered shoulder 6 of the recess, whereby the shoulders will be sealingly contacting each other in the clamping position. The cone angle (angle C) of the shoulders must be smaller than 30° (if the angle is greater there will be no correct centering between the recess and the housing) but not so small that a locking occurs like that achieved by means of a tool cone (this locking effect occurs when the angle is abut 10°). It has been found that a preferable cone angle is about 25°.

The actual clamping mechanism 7 consists of a piston 15 which is slidably provided in a central opening 14 in the housing and which at its circumference is provided with a sealing ring 16 for efficiently sealing against the inner wall of the opening 14. The piston 15 is also provided with a piston rod 17 which is formed integral with the piston and around which a number of cup springs 18 are positioned. In order to produce the clamping force the cup springs 18 are biased against the upper side of the piston 15 by means of a nut 19 screwed into the opening and forming a collar therein. A support plate 20 is secured to the upper end of the piston rod 17 by means of a central bolt 21. On the upper side of the support plate 20 a number of clamping means in the shape of clamping hooks 8 are pivotally mounted on pins 22. In the illustrated embodiment four clamping hooks 8 are provided which taken in pairs are diametrically opposed to each other so that a self-centering locking is achieved against the head 4 of the cylindrical holding means 2. However, the number of clamping hooks may vary for different applications.

The clamping hooks are biased outwardly towards their disengaging position by means of springs 23, but their pivotal movement outwards is restricted by a guide surface 24. In order to prevent that the springs 23 are damaged by the clamping hooks when the latter are pivoted, a relatively thin (about 1 mm) washer 23a is interposed between the springs and the lowermost portion of the hooks. Thus the springs act upon the hooks through the washer and the pivotal movement of the hooks may not damage the springs. The rear surface 25 of the clamping hooks, which surface cooperates with the guide surface 24, is straight while the guide surface 24 of the nut 19 is provided with a lower vertical portion and an upper portion which is inclined outwardly from the clamping hooks. These upper and lower portions of the guide surface meet at a curved middle portion and it has been found to be preferable if this portion has a radious of a curvature of about 3.8 to 4.0 mm. The importance of this configuration will be explained more closely below in connection with the description of the clamping operation.

The surfaces 26 and 27 on the clamping hook and on the head 4 of the holding means respectively are shaped with negative angles for obtaining a secure clamping. Moreover these surfaces are preferably shaped in such a way that they form a part of a circle having its centre in the centre of the swinging movement of the clamping hooks. Hereby the clamping hooks may be swung free from the head of the holding means after a very short disengagement distance.

Preferably hydraulic oil is used for maneuveing the clamping device. Through a bore 28 at the bottom of the housing 9 this hydraulic fluid is conducted to a chamber below the piston 15 from a pressurized fluid source P. It has been indicated above that only a very slight disengagement distance is required in order to release the clamping hooks from the holding means and thus only a very small amount of hyraulic oil is consumed. This in turn means that a booster advantageously may be used in the situations where hydraulic oil cannot be taken directly from the existing hydraulic system in the machine tool. In order to prevent hydraulic oil from leaking out from the chamber below the piston 15 and out on the machine table 10 O-rings 29 are prefereably arranged around each mounting bolt 11 at the bottom of the housing 9. In order to prevent hydraulic oil from leaking out between the support 20 and the piston rod 17 a copper washer 33 is in the illustrated embodiment provided between the central bolt 21 and the piston. For this purpose it is also possible to provide O-rings or other seals between the piston rod 17 and the support 20.

The operation of the clamping device will be more closely described below. In the normal position, i.e. when the chamber below the piston 15 is not pressurized by means of hydraulic oil, the clamping device is in the condition illustrated in FIG. 2 where the clamping hooks 8 are swung into their clamping position. When clamping subsequently is to be performed a valve (not shown) is switched over and pressurized hydraulic fluid is supplied below the piston 15, whereby the piston 15 is pushed upwardly counteracting the force from the cup springs 18. During the upward movement of the piston the clamping hooks 8 slide with their rear surfaces 25 continuously engaging the guide surface 24 due to the bias from the springs 23. During the upward movement the clamping hooks are consequently swung outwardly to their disengagement position illustrated in FIG. 3. The outwardly directed swinging movement starts when the centres of the pins 22, by means of which the hooks are pivotally mounted, reach a position in level with the curved portion of the guide surface 24, and due to the specific shape of this guide surface only a very slight movement of the clamping mechanism is required in order to swing the hooks to their completely disengaged postion. When the clamping device has been brought to this disengagement position in the described manner, the fixture 1 is lowered until its tapered shoulder 6 rests against the tapered shoulder 13 of the housing 9. During this step said shoulders assist in guiding the fixture so that it assumes its correct position in relation to the machine table. In this postion the hydraulic fluid is evacuated from the chamber below the piston 15 so that this chamber is releaved from pressure whereby the cup springs 18 push the piston downwardly. During this downwardly directed movement the clamping hooks are gradually swung inwardly towards the holding means through the engagement between their straight rear surfaces 25 and the curved guide surface 24 of the nut. Due to the fact that the guide surface 24 is shaped with a curved portion no substantial forces will act between said surface and the rear surface 25 of the hooks during the inwardly swinging movement. This in turn brings about the advantages that the friction therebetween is very low and thus the surfaces will not be subject to any wear. The reason for this is that the inwardly swinging movement of the hooks is "idle", and that the locking or clamping action between the holding means the hooks does not occur until the centres of the pins 22 pass the imaginary intersecional point of the above mentioned upper and lower portions of the guide surface 24, i.e. when the hooks are completely swung in towards the holding means and only move straight downwardly in the clamping direction. Since the holding means 2 has been preadjusted in the above desribed manner the clamping hooks will clamp the fixture aginst the housing 9 of the clamping device with the full force of the cup springs 18 due to the engagement between their surfaces 26 and the surface 27 of the holding means. The mutual positioning of the tapered shoulders 6 and 13 respectively is selected in such a way that the fixture, when clamped is positioned at a distance from the machine table. Hereby cuttings which may remain on the work table cannot have any negative influence on the clamping.

Depending upon the size of the work piece to be clamped and on the force necessary for the clamping, an optional number of clamping devices may be used, but the clamping force may also be adjusted by using a greater or smaller number of cup springs. In this manner it is possible to use the invention for extremely reliable and accurante clamping of work pieces using clamping forces of e.g. 100 kilos and up to 50 tons. By means of the described structure the following advantages may also be achived:

The fixtures etc. may apart from the relatively small recesses be completely flat on their underside so that they advantageously may be transported on e.g. roll conveyors;

The clamping device may easily be installed in existing machines due to the fact that in principle only four mounting holes for the housing need to be drilled in the existing machine table;

Pallets, fixtures etc. may be very small in size due to the fact that the clamping device has small outer dimensions;

All fragile or sensitive parts of the clamping device are well protected against external influence;

The structure permits a very efficient cleaning of all portions of the clamping device (more closely described below);

The short clamping and disengagement movement respectively permits the use of a booster for maneuvering the clamping device;

The clamping device is very uncomplicated and is therefore comparatively inexpensive to manufacture.

In order to guarantee that the clamping action is not disturbed by fouling of the different components of the clamping device or by cuttings remaining thereon and completely blocking the operation or decreasing the accuracy, it is necessary to perform an effective cleaning of all surfaces of the clamping device. This is expecially true by the embodiment illustrated in the drawings, where the fixture must be clamped with great accuracy and where it is extremely vital that no foreign objects remain between the cooperating tapered shoulders 6 and 13. Since the clamping in such cases often must be performed with an accuracy of a few hundreds of millimeters or even less it is obvious that no objects whatsoever may remain between said surfaces. According to the invention such an accuracy may be guaranteed by providing a pressurized air channel 30 having an opening 30a into the housing 1. This channel leads into the space above the piston 15 where the cup springs 18 are provided. By way of one or several channels 31 through the support 20 and possibly also through the piston rod, pressurized air is conducted from the spring space and in between the clamping hooks 8. Through a schematically indicated valve 32 pressurized air is conducted from a pressurized air source Q and into the channel 30 simultaneously with the introduction of hydraulic oil below the piston 15 for the disengagement of the clamping device. The pressurized air is supplied during the entire clamping operation and initially cleans the space around the clamping hooks 8 in an efficient manner. Due to the fact that the cleaning air is supplied from within the actual clamping mechanism much more effective cleaning of the space is achieved than that achieved if pressurized air from the outside is directed down towards said space. It should also be mentioned that a fine oil mist may be supplied together with the pressurized air for simultaneous lubrication of the cup springs and to a certain extent also of the surfaces 24 and 25 of the nut and hooks 8 respectively (hereby friction therebetween is further reduced).

As the fixture 1 is lowered down over the housing 9 of the clamping device and the gap through which presurized air may flow out becomes smaller, the flow rate of the air increases and thereby an extremely efficient cleaning of the critical shoulder surfaces 6 and 13 is achieved up to the moment when said surfaces contact each other. When clamping has been performed by evacuating the hydraulic oil from below the piston 15 the valve 32 may be switched over so that pressurized air is trapped in the space between the fixture and the housing of the clamping device. Since the cooperating shoulder surfaces 6, 13 must have a very fine or smooth surface in order to guarantee the above mentioned great accuracy of the clamping, they will also seal off the space between the fixture and the housing so completely that a certain pressure is maintained therein. This also makes it possible to efficiently control that the clamping has been performed with desired accuracy. This control is accomplished by connecting a pressure governor to said space; in the illustrated embodiment this is indicated by means of a pressure gauge 34 connected to the pressure conduit 30. By means of a control unit (which forms no part of the invention and is therefore not illustrated or described in any detail) it is possible to check that the pressure does not decrease two rapidly per unit of time. Since the pressurized air supply, as mentioned above, is interupted when complete clamping has been performed it is possible to calculate the fall of pressure that may be accepted during a fixed unit of time for each desired range of accuracy, and if the pressure falls more rapidly than the set value this means that some object remains between the tapered shoulder surfaces and permits air to flow out from the space between the fixture and the housing of the clamping device. Since this in turn means that the desired accuracy does not exist the machine tool is brought to a standstill so that the cause of the disturbance may be investigated. The indicated controlling of the fall of pressure per unit of time and the automatic stopping of the machining is performed by means of conventional control engineering and does not form any part of the invention.

Although the invention has been desscribed above with specific reference to an application on a machine tool where extreme accuracy is required, it should be obvious that the clamping device according to the invention is not delimited to this specific embodiment but can be modified within the scope of the enclosed patent claims. Thus it is possible to shape the recess as well as the housing without the tapered shoulders by applications where no specific accuracy is required. Similarly it is also possible to arrange the clamping mechnism with its housing and the holding means in a plurality of alternative manners. E.g. it can be mentioned that by certain applications it may be preferable to provide the housing of the clamping mechanism partly or completely embedded in the machine table. Furthermore the holding means may well have any other shape than the illustrated which is circular in cross-section, and e.g. it may also be square or rectangular in cross-section. At certain occations it may finally be sufficient to use only two opposed clamping hooks; alternatively more than four such clamping hooks may be used. Such modifications do consequently fall within the basic concept of the invention.

I claim:

1. In a clamping device for clamping such apparatus as worktables and fixtures on a base, such as on the machine table of a machine tool, said clamping device including a holding means (2) having an enlarged head (4) and being secured to either of said apparatus or said base, and a housing (9) being secured to the other of said apparatus or said base, said housing (9) having a central opening (14), a clamping mechanism (7) received in said central opening (14) and carrying clamping means (8) comprising clamping hooks pivotal between a clamping position for engaging head (4) of said holding means (2) and a disengagement position for completely disengaging said head of said holding means, the improvement comprising clamping means (7) for clamping and unclamping said clamping hooks so that in a normal condition said clamping means acts with its full clamping force against said clamping hooks and in a disengaging condition said clamping means unloads said clamping hooks when a disengagement force is applied thereto, said clamping means (7) comprising a mechanical clamping force means (18) for acting between a collar (19) positioned at the inner wall of housing (9) and a piston (15) sealingly engaging said inner wall of housing (9) and having a piston rod (17) having an end extending from a first side of said piston and facing said holding means (2), said end carrying the clamping hooks (8); said piston (15) being constantly acted upon by said clamping force means (18) for urging piston 15 and thereby piston rod (17) and said clamping hooks in a direction away from holding means (2) but being urged in the opposite direction when said disengagement force, counteracting and exceeding said clamping force, is applied to a second side of piston (15) opposite said first side to which said piston rod is connected; and, said clamping hooks (8) being slidable in central opening (14) of housing (9) and engaging a guide surface (24) provided on said inner wall of housing (9) for swinging movement of said clamping hooks towards the clamping position during movement of said clamping hooks in the clamping direction and for preventing movement from the clamping position during clamping.

2. Clamping device according to claim 1, wherein the clamping force means are cup springs (18) clamped between collar (19) of housing (9) and piston (15) and arranged around said piston rod (17).

3. Clamping device according to claim 1, wherein said clamping hooks (8) are biased in the direction towards their disengagement positions by a spring (23).

4. Clamping device according to claim 1 wherein said head (4) of holding means (2) and said clamping hooks (8) are provided with cooperating engagement surfaces (26, 27) forming negative angles and in the plane of said swinging movement of said hooks substantially forming a part of a circle having its center in the center of said swinging movement of hooks (8).

5. Clamping device according to claim 1 wherein holding means (2) includes a pin which is circular in cross-section and which has a head (4) which is circular in cross-section and wherein at least three clamping hooks (8), are uniformly distributed around the holding means, whereby a self-centering is achieved.

6. Clamping device according to claim 1 wherein holding means (2) is provided in a recess (3) which is circular in cross-section and includes an opening and a bottom and is provided with a tapered shoulder (6) therebetween, and wherein housing (9) is circular in cross-section and has a maximum outer diameter slightly smaller than the diameter of said recess, said housing at its outer wall being provided with a tapered shoulder (13) having substantially the same cone angle as said tapered shoulder (6) of said recess (3).

* * * * *